(12) United States Patent
Niemi

(10) Patent No.: US 11,645,507 B2
(45) Date of Patent: May 9, 2023

(54) PROVIDING MODELS TO CLIENT DEVICES

(71) Applicant: VMware, Inc., Palo Alto, CA (US)

(72) Inventor: Kurt Niemi, Norcross, GA (US)

(73) Assignee: VMware, Inc., Palo Alto, CA (US)

(*) Notice: Subject to any disclaimer, the term of this patent is extended or adjusted under 35 U.S.C. 154(b) by 1448 days.

(21) Appl. No.: 15/933,922

(22) Filed: Mar. 23, 2018

(65) Prior Publication Data

US 2019/0294960 A1 Sep. 26, 2019

(51) Int. Cl.
*G06F 15/16* (2006.01)
*G06N 3/08* (2023.01)
*G06F 9/455* (2018.01)
*G06F 21/33* (2013.01)
*G06F 21/44* (2013.01)

(52) U.S. Cl.
CPC ........... *G06N 3/08* (2013.01); *G06F 9/45558* (2013.01); *G06F 21/335* (2013.01); *G06F 21/44* (2013.01); *G06F 2009/45562* (2013.01); *G06F 2009/45575* (2013.01); *G06F 2009/45595* (2013.01)

(58) Field of Classification Search
CPC ....... G06N 3/08; G06F 21/44; G06F 9/45558; G06F 21/335; G06F 2009/45562; G06F 2009/45575; G06F 2009/45595; G06F 9/4843; G06F 2009/4557; G06F 8/31; G06F 21/45

See application file for complete search history.

(56) References Cited

U.S. PATENT DOCUMENTS

| | | | | |
|---|---|---|---|---|
| 10,803,392 B1* | 10/2020 | Khan | .................... | H04L 67/10 |
| 11,270,201 B2* | 3/2022 | Sridharan | ............ | G06F 9/5061 |
| 2019/0253519 A1* | 8/2019 | Milosevic | ............... | H04L 67/55 |
| 2020/0293720 A1* | 9/2020 | Tu | ......................... | G06F 40/289 |
| 2020/0394564 A1* | 12/2020 | Singh | .................... | G06N 5/003 |

OTHER PUBLICATIONS

Email Overload in the Enterprise, SaneBox, http://d1faw2u3edxi8l.cloudfront.net/pdfs/Email%20Overload%20White%20Paper.pdf, Accessed: Jan. 5, 2017.

* cited by examiner

*Primary Examiner* — John B Walsh

(74) *Attorney, Agent, or Firm* — Thomas | Horstemeyer, LLP

(57) ABSTRACT

Various examples for providing neural network models to client devices are described. A management application can cause a training environment to be created for training a neural network using enterprise data authorized by a client device. The management application can cause the client device to send the enterprise data to the training environment. The management application can cause a training application running in the training environment to create a neural network model using the enterprise data. The management application can send a neural network model to the client device.

17 Claims, 4 Drawing Sheets

PROVIDING MODELS TO CLIENT DEVICES

BACKGROUND

Client devices that execute Android™ or iOS® are capable of executing neural network-enabled applications that apply trained neural networks to perform tasks. Training neural networks on client devices can be problematic due to limited resources. Furthermore, tools that train neural networks on other devices can be cumbersome to use in the enterprise environment. Security and privacy challenges may also need to be addressed when using tools to train neural networks using enterprise data such as unfulfilled orders, customer complaints, and uncompleted tasks. Therefore, a more private and secure process for providing a neural network model to a client device is needed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
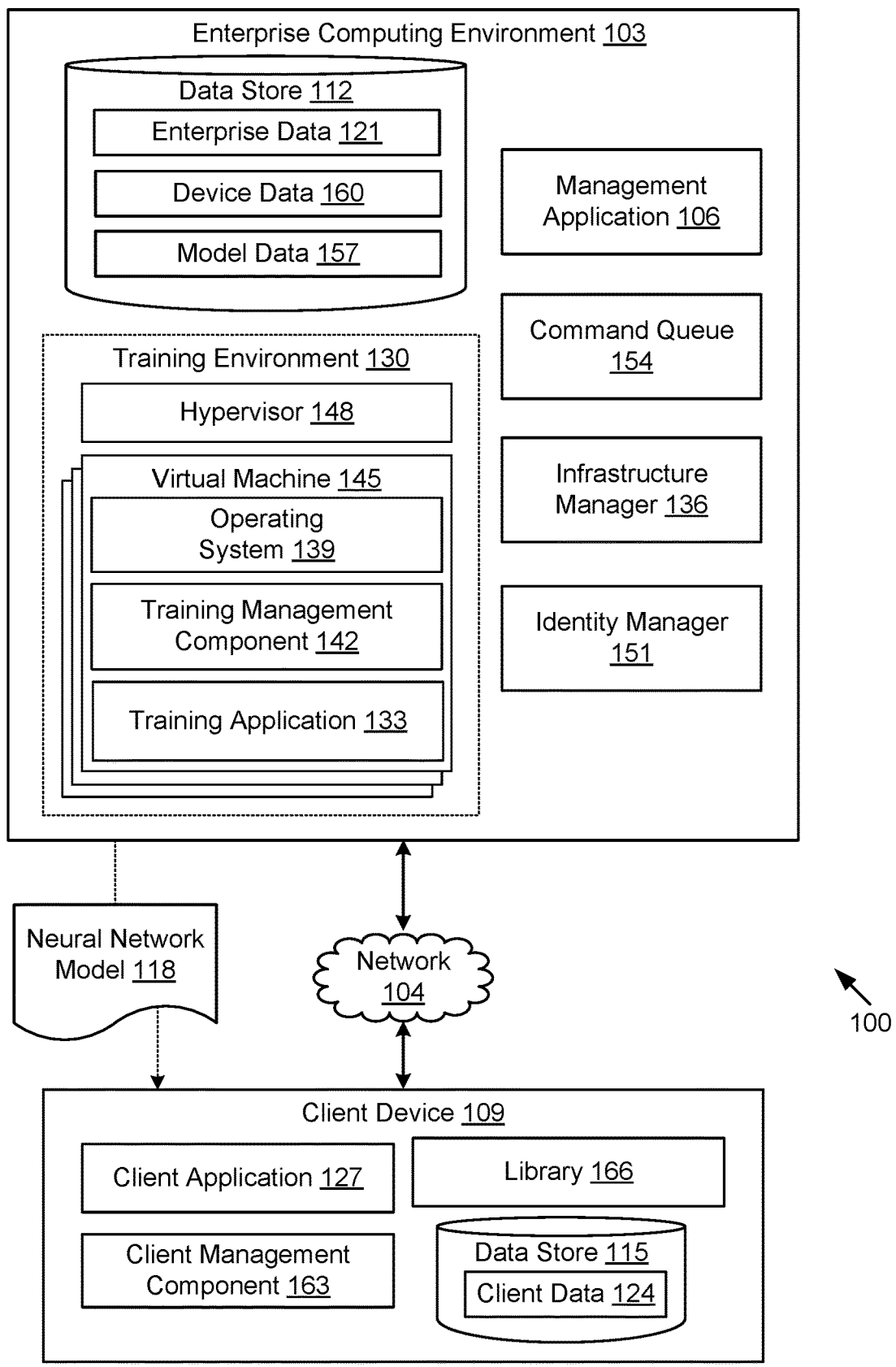
FIG. 1 is a drawing of a networked environment for training a neural network and providing a neural network model to a client device.

The present disclosure relates to providing enterprise-specific neural network models to client devices. Client devices are capable of executing neural network-enabled applications. For example, some neural network-enabled applications, such as voice-activated personal assistants, apply trained neural network models to classify data and infer a result. Training refers to a process of creating a trained neural network model by applying a framework, for example, a deep learning framework, to a dataset. However, many client devices lack sufficient resources to perform training or create a trained neural network model. For example, a client device might have limited CPU, battery, memory, or background execution time. Therefore, training can be performed on a server, and the pre-trained neural network can be provided to the client device. In one example, pre-trained neural network models can be generated for devices that are running Android™ or iOS®, respectively.

Training a neural network on a server and providing the pre-trained neural network to the client device offers its own set of security and privacy challenges. A pre-trained neural network model may be useful when the neural network model is used in traditional or consumer applications dealing with limited situations. For example, a neural network model could use text classification based on a non-enterprise or publicly-available data set. However, classifying text in this way does not account for differences between the data set and enterprise data that may not be publicly available. Again, problems with providing enterprise-specific neural network models to client devices include security and privacy challenges with training neural network models using private and potentially sensitive enterprise data.

Therefore, examples of this disclosure provide a mechanism to create a secure and private process to provide an enterprise-specific neural network model. In examples of this disclosure, a training environment generates an enterprise-specific neural network model based upon enterprise or client data. Most enterprises have access to data, such as emails, contacts, tasks, orders, invoices, or other data that has value to the enterprise. Because of variances between how the enterprises operate and assign value to this data, an enterprise can be associated with an enterprise-specific neural network model.

In some examples, a neural network-enabled application can use the enterprise-specific neural network model to infer a result. As an example, a neural network model can be pre-trained with enterprise data, such as emails, to perform a text-based classification of the emails. A neural network-enabled application can identify important emails using the neural network model. Further, because the emails can have associated security and privacy concerns, a user on a client device can authorize transmission of the emails to a training environment. In some examples, a user can authorize sending the emails as input to a neural network training application that can exist within a remotely executed training environment.

Thus, the present disclosure provides a client device an enterprise-specific neural network model based on client data authorized by a user. Some examples of this disclosure create a training environment for training a neural network based on enterprise data.

With reference to FIG. 1, shown is an example of a networked environment 100. The networked environment 100 includes an enterprise computing environment 103 and one or more client devices 109 in communication by way of network 104. The network 104 can include, for example, wide area networks (WANs), local area networks (LANs), wired networks, wireless networks, other suitable networks, or any combination of two or more networks. For example, the network 104 can include satellite networks, cable networks, Ethernet networks, and other types of networks. The network 104 can also include a combination of two or more networks 104. Examples of networks 104 can include the internet, intranets, extranets, virtual private networks (VPNs), and similar networks.

The enterprise computing environment 103 can be a computing environment that is operated by an enterprise, such as a business or other organization. The enterprise computing environment 103 can include, for example, a server computer, a network device, or any other system providing computing capabilities. Alternatively, the enterprise computing environment 103 can employ multiple computing devices that can be arranged, for example, in one or more server banks, computer banks, or other arrangements. The computing devices can be located in a single installation or can be distributed among many different geographical locations. For example, the enterprise computing environment 103 can include multiple computing devices that together form a hosted computing resource, a grid computing resource, or any other distributed computing arrangement.

In some cases, the enterprise computing environment 103 can correspond to an elastic computing resource where the allotted capacity of processing, network, storage, or other computing-related resources can vary over time. In some instances, the enterprise computing environment 103 can be hosted within the same computing environment or be separate logical components of the same computing environment. This could occur, for example, if the enterprise computing environment 103 corresponded to one or more virtualized computing devices hosted by the same provider or in the same datacenter. The enterprise computing environment 103 can be located remotely with respect to the client device 109.

The computing environment can include a data store 112 and a data store 115. The data stores can include memory of the computing environment 103, mass storage resources of the computing environment 103, or any other storage resources on which data can be stored by the computing environment 103. The data stores can include one or more relational databases, such as a structured query language (SQL) database or a no-SQL database. The data stores can also include non-relational databases in some examples. The data stored in the data store 112 and the data store 115, for example, can be associated with the operation of the various applications or functional entities described below.

Various applications or other functionality can be executed in the enterprise computing environment 103. The components executed on the enterprise computing environment 103, for example, can include a management application 106 and other applications, services, processes, systems, engines, or functionality not discussed in detail herein. The management application 106 can provide an enterprise-specific neural network model to a client device 109. To this end, the management application 106 can cause a neural network model 118 to be created using enterprise data 121, or in some instances client data 124 associated with the enterprise data 121.

The components executed on the enterprise computing environment 103 can include virtualization and other technology that trains a neural network model 118. The virtualization and other technology also streamlines the process of providing the neural network model 118 to a client device 109. Employing virtualization technology can streamline these processes by creating a training environment from a template and automating the training.

To illustrate the concept, the enterprise computing environment 103 can include a management application 106, a client device 109, a data store 112, and a data store 115. A client application 127 can send the management application 106 authorization to train a neural network using client data 124 stored in the data store 115. The management application 106 can receive the authorization and perform various tasks. The various tasks can include creating a training environment 130, causing a training application 133 to train the neural network and output a neural network model 118, and providing the neural network model 118 to the client device 109.

The management application 106 can cause an infrastructure manager 136 to create a training environment 130 that is a clone of a template. An infrastructure manager 136, such as a VMWARE® vCenter Server™, provides the management application 106 with a centralized platform for managing a training environment 130 (including hypervisor 148 and virtual machine 145). The infrastructure manager 136 can provide a number of features to streamline providing a neural network model 118 to a client device 109. For example, infrastructure manager 136 can maintain templates that include an operating system 139, a training management component 142, and a training application 133. These templates can be used to clone a virtual machine 145. Additionally, the infrastructure manager 136 provides the management application 106 with management and deployment functionality to simplify administration of the training environment 130.

A training environment 130 can include a hypervisor 148 and one or more virtual machines, referred to herein as virtual machine 145. The virtual machine 145 can be a virtualized computer instance that can emulate the operation of components of a physical computer. The hypervisor can instantiate and execute the virtual machine 145. In some examples, the hypervisor 148 can also monitor the operation of the virtual machine 145. Additionally, the hypervisor 148 can control various components within the virtual machine 145. Also, the hypervisor 148 can be an application that provides an execution platform for one or more virtual machines 145 by providing a containerized environment in which data is allowed to be transmitted to and from an operating system after a user on a client device 109 has authorized training a neural network.

The management application 106 can also use an identity manager 151 such as VMWARE® Identity Manager™. The identity manager 151 can include identity provider (IdP) functionality to create one or more root or intermediate certificates to secure communications between a client device 109 and a training environment 130. The management application 106 can use the identity manager 151 to create certificates. For example, management application 106 can cause the identity manager 151 to create a public key certificate that the management application 106 can send to a virtual machine 145. The public key certificate can be sent as part of a command stored in the command queue 154. The management application 106 can also seed certificates in device data 160 by executing a script. Seeding in this context means to update blank values in the data store 112 to reflect particular certificates used to secure communications.

The client application 127 can send the client data 124 to a virtual machine 145. The virtual machine 145 runs a training application 133 to train a neural network using the client data 124. Training refers to a process of creating a trained neural network model 118 by applying a framework, for example a deep learning framework, to a dataset. A training framework is a software library used to design, build, and train machine learning models. Examples training frameworks include TensorFlow™, Caffe, Apache® Singa, Microsoft® Cognitive Toolkit (CNTK), Theano, and Torch. A training framework uses deep learning methods to output a model. A model is a snapshot of the trained neural network saved so that a client application can later retrieve the trained neural network and use the trained neural network to perform an inference. One advantage of using the TensorFlow™ framework is that client applications on client devices running Android™ or iOS® platforms can use a TensorFlow™ output or model to perform an inference.

Inference occurs when a trained neural network is put to work to perform a task such as text classification. The field of Natural Language Processing (NLP) includes many approaches for training a neural network to perform a text classification. The Bag of Words is a common approach to solving a variety of text classification problems. In one approach, each word in the English language would be an input node to the neural network. The numeric input for each word would be the count of how many times that word is used. It is also possible for a training application or an approach for training a neural network model to exclude words that do not provide any value in identifying the text classification.

Words that occur frequently in one class and infrequently in another class are of higher predictive value. The Term Frequency/Inverse Document Frequency (TF-IDF) algorithm can be used to calculate a score for each word. A word can be classified, based on its score, as belonging to either a positive or a negative class. Words with the highest scores in the positive and the negative class can be selected as input to the neural network.

Using these techniques, the training application 133 creates a neural network model 118 that the management application 106 can provide to the client device 109. The client application 127 can then use the neural network model 118 to perform an inference.

Referring still to FIG. 1, the management application 106 can cause a training application 133 to execute on a virtual machine 145 in a training environment 130. For example, the management application 106 can place a command in a command queue 154 associated with a training environment 130. A training management component 142 can pick up the command and run the command to cause the training application 133 to use a neural network framework to create a neural network model 118.

The management application 106 can create one or more neural network models 118 by executing the training application 133. The training application 133 can receive one or more parameters as program input and through application programming interfaces (APIs). API calls can be implemented as a Representational State Transfer (REST) API using a JavaScript Object Notation (JSON) object payload over HyperText Transfer Protocol (HTTP/HTTPS).

The training application 133 can be executed in the virtual machine 145 to create the neural network model 118. The training application 133 can use TensorFlow™ to train a neural network, using the data, to perform a text classification.

Execution of the TensorFlow™ framework allows the training application 133 to train a neural network and to create a neural network model 118 as an output. In some cases, the training application 133 will also preprocess the enterprise data before sending the data to the training framework. The training application 133 can save the output from the TensorFlow™ training framework as a neural network model 118. A neural network model 118 includes a topology that relates input nodes to output nodes based on the approach used to train the neural network. To perform a text classification, text is vectorized (or tokenized) and applied to the input nodes. Neural networks can work with numerical input and output, so one example of the present disclosure can convert text into a set of numbers to be inputs to the neural network. In addition, the neural network model 118 includes weights that represent knowledge gained through training the neural network.

In some examples, the neural network model 118 is based on enterprise data 121 authorized by a user of the client device 109. The training application 133 can receive the enterprise data 121 as an input to the training application 133. The training application 133 can use the framework, along with the enterprise data 121, to create the neural network model 118.

Also, the training application 133 can include functionality that applies a softmax algorithm to the output nodes after the enterprise data 121 is run through the training application 133. One purpose of using the softmax algorithm is to validate that an output node will have a value in the range of zero (0) to one (1) and that a higher numeric value indicates a higher probability that a given input has a text classification corresponding to the output node.

As discussed above, the training application 133 can output a model which is a neural network model 118 that can be used by applications running on client devices 109. The neural network model 118 is also described as a pre-trained neural network or an enterprise-specific neural network model.

Referring still to FIG. 1, the management application 106 can store enterprise-specific neural network models 118 in the model data 157 for one or more client devices 109. The model data 157 can represent a table or database where enterprise-specific neural network models that are associated with client devices 109 are stored or archived. The management application 106 can use the model data 157 to respond to a request by a client device 109 to provide an enterprise-specific neural network model 118.

The management application 106 can also access device data 160 that can include device records corresponding to client devices 109 for which an enterprise-specific neural network model 118 is stored in the model data 157. The device data 160 can also include information about other devices that might be enrolled as managed devices with the management application 106. The device record can include information about the device such as an OEM, an operating system, or a reference to a particular enterprise data 121 or client data 124 that can be used to generate an enterprise-specific neural network model 118 corresponding to the client device 109.

The client device 109 can represent multiple client devices 109 coupled to the network 104. The client device 109 includes, for example, a processor-based computer system. According to various examples, a client device 109 can be in the form of a desktop computer, a laptop computer, a personal digital assistant, a mobile phone, a smartphone, or a tablet computer system.

The client device 109 can execute an operating system, such as Windows™ Android™, or iOS®, and has a network interface to communicate with the network 104. The client device 109 has a data store 112 with various data, including application data, operating system data, and other data. In the context of this disclosure, the data store 112 can house client data 124 that can be used to generate an enterprise-specific neural network model corresponding to the client device 109.

The client device 109 can execute the client application 127 to facilitate creation of an enterprise-specific neural network model 118 and subsequent application of the enterprise-specific neural network model 118. The client application 127 can be implemented as a portion of a client management component 163 that is installed on the client device 109. In other implementations, the client application 127 can be implemented as a portion of the operating system of the client device 109 or as a standalone application.

The client device 109 can also include one or more libraries 166. In one example of a library 166, the client device 109 includes a tokenizer library for data processing. The Parsimmon open source library is a tokenizer library that runs on the iOS platform. The client device 109 can also include a BNNS Neural Network library as a library 166 that client application 127 uses to recreate the topology from the neural network model 118 and to copy weights into client application 127. As discussed previously, a topology relates input nodes to output nodes based on the approach used to train the neural network. Weights represent knowledge gained through training the neural network. The client application 127 extracts the topology and weights from the neural network model 118. The client application 127 can apply text to the input nodes of the neural network model 118 so that the output nodes correspond to a classification of the text applied to the input nodes.

The client application 127 can display a user interface and use a neural network model 118 to allow a user to sort emails based on a relationship to one or more output nodes of the neural network. For example, the neural network can have two output nodes. The neural network as described above can be trained to perform a text classification for sentiment, where one of the output nodes is a positive sentiment output node and one of the output nodes is a negative sentiment node. The application of an enterprise-specific neural network 118 trained in this way can be used to identify an important email (in the enterprise context). An email from a customer with a problem that needs to be addressed can correlate with a negative sentiment output node. For example, the following contains negative sentiment: "I hate using SomeOther app. The application never works, and crashes all the time," "One must abhor an application that does not work," and "We all detest using the other application."

Also, an email from a customer providing positive feedback on a product can correlate with a positive sentiment output node. For example, the following contains positive sentiment: "I love using Boxer. It's my favorite application. I would highly recommend it." "Boxer is awesome! It is always there when I need it," and "My favorite love is using Boxer. It just simply works when I need it." Allowing the user of the client application 127, such as the VMWARE® Boxer email client, to sort new emails by sentiment would allow the user to more quickly respond to customer needs by first working with customers who have problems or issues.

Thus, the user of the client application 127 can determine if an email deserves an immediate response by recognition of the overall sentiment of an email. Emails with a negative overall sentiment can indicate there is a problem or issue that needs to be addressed. The client application 127 provides the capability to perform various sorts based on the sentiment analysis. The user can sort by sender importance and give minimal weight to sentiment analysis, or the user can perform a primary sort of email sentiment with negative emails ordered first and a secondary sort of sender importance, among other types of sorts.

Various data is stored in a data store 112 that is accessible to the enterprise computing environment 103. The data store 112 can be representative of a plurality of data stores 112, which can include relational databases, object-oriented databases, hierarchical databases, hash tables or similar key-value data stores, as well as other data storage applications or data structures. The data stored in the data store 112, for example, is associated with the operation of the various applications or functional entities described below. The data stored in the data store 112 can include enterprise data 121, which can include emails, contacts, tasks, orders, and invoices. The data store 112 can also include device data 160 (one or more locators and client IDs), model data 157, and potentially other data.

Figure 2:
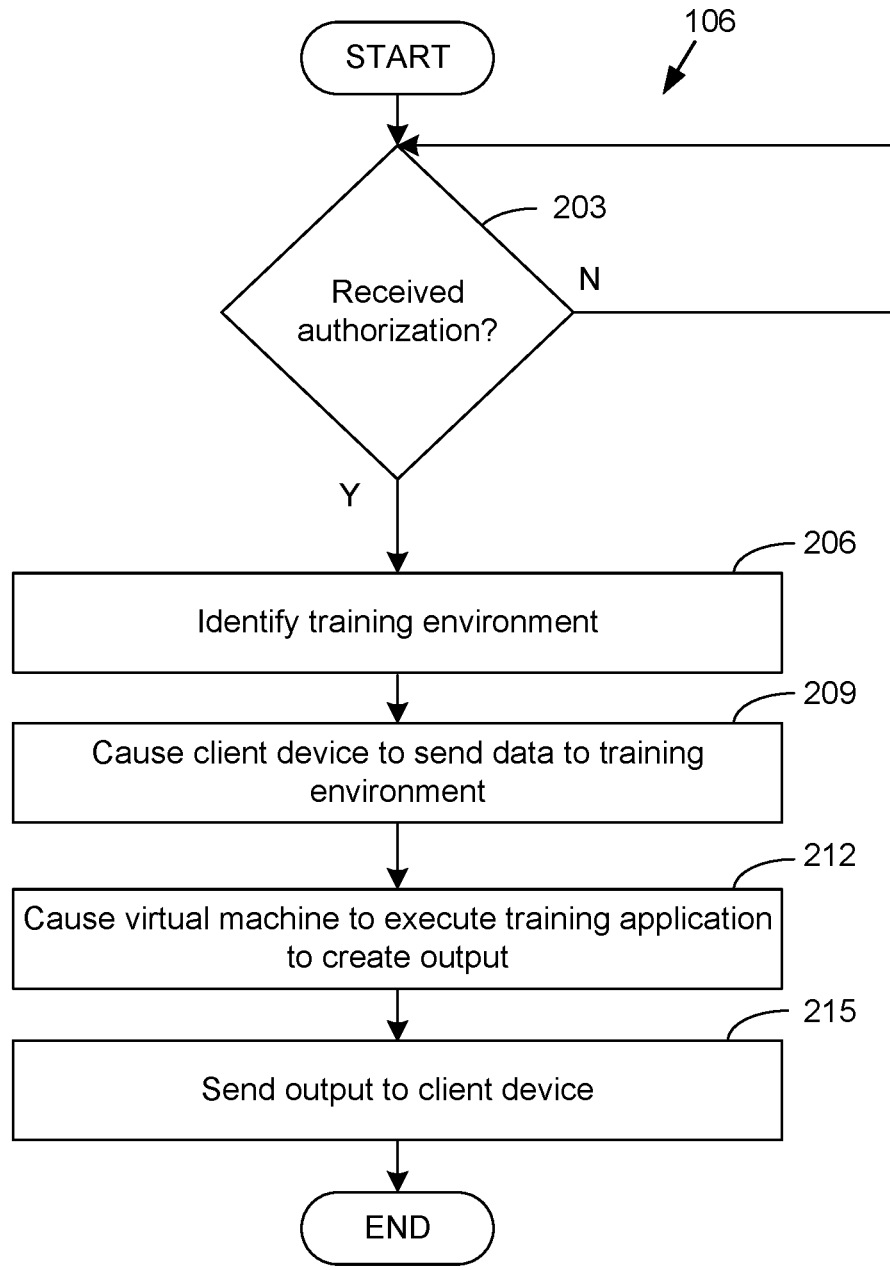
FIG. 2 is a drawing of a flowchart illustrating an example operation of the management application training a neural network and providing a neural network to a client device.

Turning now to FIG. 2, a flowchart is shown that provides one example method of how the management application 106 can provide an enterprise-specific neural network model 118 to a client device 109. The process shown in FIG. 2 can be initiated by the management application 106 to cause the client application 127 to authorize training a neural network and to receive an enterprise-specific neural network model 118. FIG. 2 also illustrates a method for securely transmitting client data 124 from a client device 109 to a virtual machine 145 capable of training a neural network.

Beginning with step 203, the management application 106 can determine that an authorization for training a neural network using enterprise data 121 has been received. For instance, the management application 106 can receive the authorization as a results of a user operating a client application 127 and clicking a button to authorize sending enterprise data 121 for training a neural network. Examples of enterprise data include emails, contacts, tasks, orders, and invoices.

At step 206, the management application 106 can identify a training environment 130 for training the neural network. In some examples, the management application 106 can determine which virtual machine 145 to use for running a training application 133 and training a neural network. For example, the management application 106 can determine that a client device 109 from step 203 has an associated training environment 130 by virtue of the client device 109 being related to a particular enterprise, customer, or client that can be identified by the management application 106. The management application 106 can also identify a training environment 130 based on a distribution of training activity workload between multiple training environments 130 or virtual machines 145.

Upon identifying a training environment 130, the management application 106 can identify a locator that allows the client device 109 to communicate with the training environment 130. A locator is a representation of a location of the virtual machine 145 on the network 104 that another device can use to reach the virtual machine 145. The locator can be a hostname, Uniform Resource Locator (URL), or an internet protocol address.

In some examples, management application 106 creates a training environment 130 as part of identifying a training environment 130. The management application 106 can cause the infrastructure manager 136 to clone a training environment 130 from a template. The template can specify features that streamline providing a neural network model 118 to a client device 109. For example, the template (and the virtual machine 145) can specify an operating system 139, a training management component 142, and a training application 133. The operating system 139 can manage emulated hardware and software resources for the virtual machine 145. The operating system 139 can also provide various services, such as an interprocess communication service that can facilitate various components within the virtual machine 145 communicating with each other.

To clone a virtual machine from a template, the infrastructure manager 136 can instruct the hypervisor 148 to obtain a package, such as a disk image file, for the virtual machine 145, and install or mount the package to thereby install the virtual machine 145. The hypervisor 148 can also render user interfaces for an operating system and cause the user interfaces to be displayed through a user interface within the operating system 139. Additionally, the hypervisor 148 can control and allocate system resources for the virtual machine 145 based on management application 106 instructions and the availability of resources.

The management application 106 receives a locator from the infrastructure manager 136, or the hypervisor 148, that a client device 109 can use to reach the virtual machine 145. In some instances, the client application 127 can also obtain the locator from the management application 106.

In this way, the management application 106 can cause a training environment 130 to be created. The training environment 130 as described above, including one or more virtual machines 145, can be specific to an enterprise, customer, client, or client device 109.

The management application 106 can also use the identity manager 151 to create a private key certificate used to secure communications from client device 109 to virtual machine 145. The management application 106 can enable a flag to indicate that a client device 109 is permitted to send enterprise data to a virtual machine 145.

At step 209, the management application 106 can cause the client device 109 to send data to the training environment 130. The data can be enterprise data stored on the client device 109 as client data 124 or enterprise data 121 obtained from the management application 106 or other remote location. For example, the management application 106 can place a command in a command queue 154 associated with a client device 109 or client management component 163 running on the client device 109. The client management component 163 can receive the private key certificate as part of the command. The client application 127 can use the private key certificate to secure communications when the client application 127 sends the client data 124 to the virtual machine 145. This step can also include encoding the client data into a format in which the client device and a training environment can work. The management application 106 can therefore cause a neural network model 118 to be created based on the client data 124.

In alternate examples, features of various email systems can be used to facilitate providing the training environment 130 access to data for training the neural network. For Google Apps, the OAuth protocol can be used to authorize a virtual machine 145 to access emails of a user. For Microsoft® Exchange or Microsoft® Office 365, the VMWARE® Boxer Email Notification Service (ENS) server can be used to collect the initial training data.

At step 212, management application 106 can use the training management component 142 to cause the virtual machine 145 to execute the training application 133. The training application 133 can receive the client data 124 and run the client data 124 through the neural network training framework to generate an enterprise-specific neural network model 118 that can be used by a neural network-enabled application, such as the client application 127.

The training application can execute a TensorFlow™ training framework to train a neural network and to create a neural network model 118 as an output. The enterprise data the training application 133 uses as input at step 212 could be any data for training the neural network (emails, contacts, tasks, orders, and invoices). The training application 133 can take into account that a numeric input for a word can be the count of how many times that word is used. The training application 133 can also exclude words that do not provide any value in identifying the sentiment of an email. For example, the word "the" does not provide any value in identifying a sentiment. The training application can save the output from the TensorFlow™ training framework as a model. A model is a snapshot of the trained neural network saved so that a client application can later retrieve the trained neural network and use the trained neural network to perform an inference.

In this way, the training application 133 can train a neural network using the enterprise data 121 and create an enterprise-specific neural network model 118. In some examples, after creating the enterprise-specific neural network model 118, the model is transmitted to the management application 106 for storage in data store 112 as model data 157.

The training application 133 can also preprocess the enterprise data before sending the data to the training framework. Preprocessing can include the training application 133 applying a tokenizer library, a softmax function, or a normalized exponential function to the enterprise data. The neural network model output from a training application 133 can also be tailored for use on a particular mobile device platform such as Android™ or iOS®. The management application 106 can maintain any of these outputs as an archive or database of enterprise-specific neural network models by storing a neural network model 118 in model data 157 as a file or as some other representation of neural network model 118.

At step 215, the management application 106 can provide the neural network model 118 to a client device 109. The management application 106 can cause a push notification to be created to notify the client device 109 that a neural network model 118 is ready for downloading. In some examples, the management application 106 can use features of a command queue 154 associated with the client device 109 to transmit the notification. The client application 127 can use the locator to connect to the training environment 130 and receive the enterprise-specific neural network model 118. In other examples, the enterprise-specific neural network model 118 is stored in the data store 112 as model data 157. In this scenario, the client application 127 can also receive the enterprise-specific neural network model 118 from the management application 106. After completing step 215, the process proceeds to completion.

Figure 3:
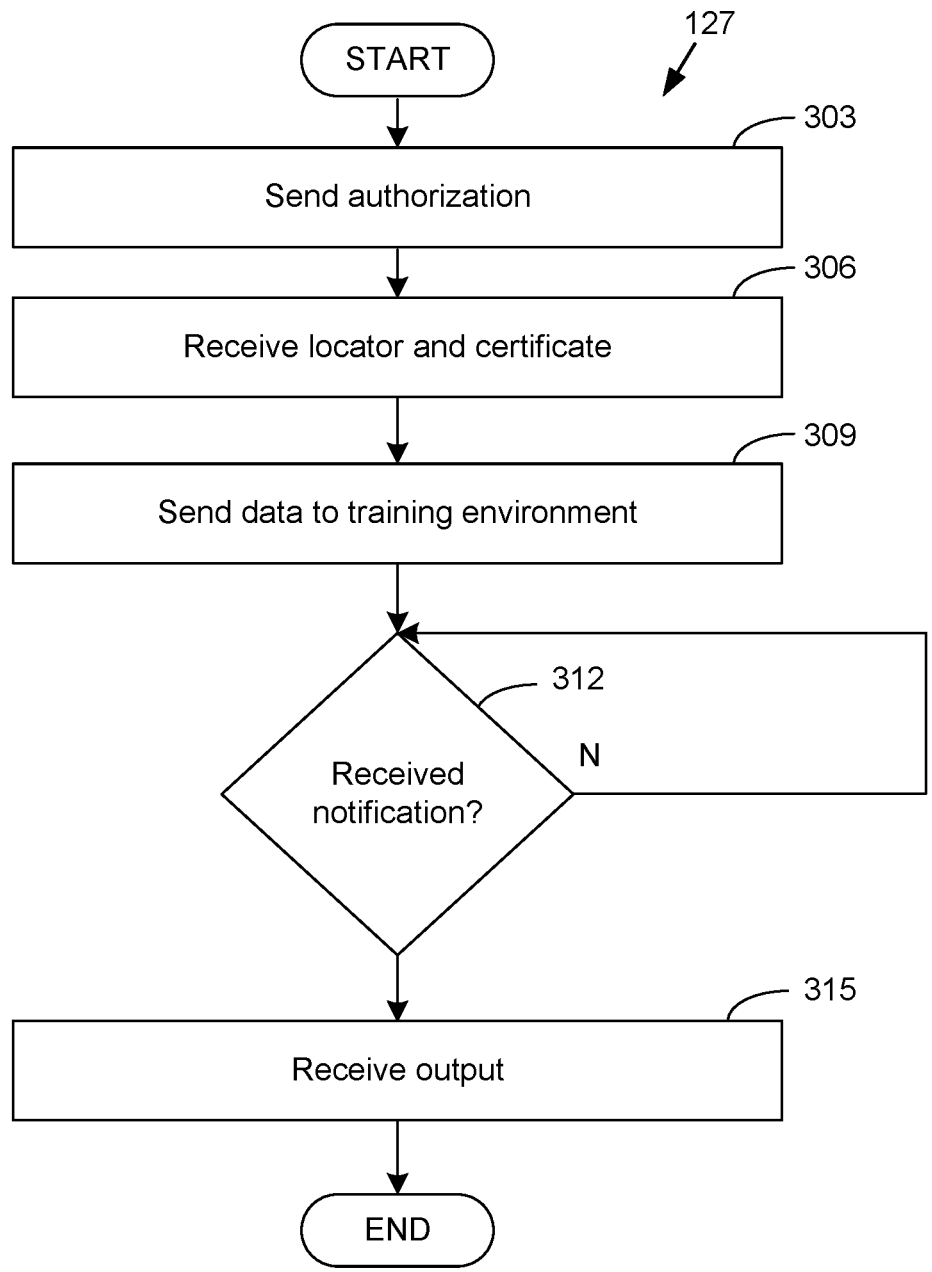
FIG. 3 is a drawing of a flowchart illustrating an example operation of the client application sending training data to a training environment and receiving a neural network model.

Referring to FIG. 3, shown is an example operation of the client application 127 obtaining an enterprise-specific neural network 118. At step 403, client application 127 can display a user interface to authorize the sending of enterprise data 121 or client data 124 to a training environment 130. For instance, a user on client device 109 can navigate one or more user interfaces of the client application 127. The user can click a button to authorize sending enterprise data 121 or client data 124 to a training environment 130. The client application 127 can also encode enterprise data 121 or client data 124 into a format in which the client device 109 and the training environment 130 can work. The client application 127 sends data to the training environment 130 so that an enterprise-specific neural network model 118 can be generated by the training application 133.

At step 306, the client application 127 or client management component 163 can retrieve a command from a command queue 154 associated with the client device 109. For example, the client management component 163 can receive a locator and a private key certificate as part of the command.

At step 309, the client application 127 uses the locator and the private key certificate to authenticate and send the client data 124 to the virtual machine 145. In some cases, the client application 127 performs the authentication and sends data to a virtual machine 145 upon receiving the command from step 406.

At step 312, the client device 109 can determine that the enterprise-specific neural network model 118 is ready to be downloaded. For instance, the client device 109 can receive a push notification to indicate that the enterprise-specific neural network model 118 is ready to be downloaded. In other examples, the client application 127 or client management component 163 can receive a command from a command queue 154 that notifies the client device 109 that a neural network model 118 is ready.

At step 315, the client application 127 or client management component 163 can use the locator from step 306 to connect to the training environment 130 and receive the enterprise-specific neural network model 118 from the training environment 130. In some cases, the client application 127 can obtain an enterprise-specific neural network model 118 from model data 157 stored in data store 112 of enterprise computing environment 103. Thereafter, the process proceeds to completion.

Figure 4:
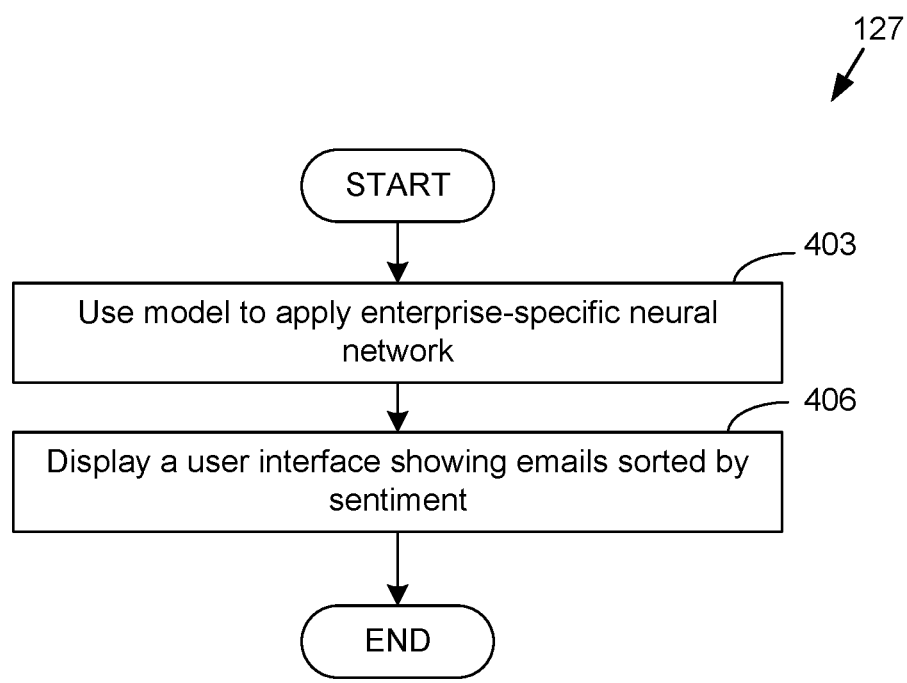
FIG. 4 is a drawing of an example operation of a client device applying an enterprise-specific neural network model to display emails sorted by sentiment.

Referring now to FIG. 4, shown is an example processing of the client application 127 applying an enterprise-specific neural network to perform a text classification of emails based on sentiment. At step 403, the client application 127 can apply an enterprise-specific neural network to incoming email(s) to identify sentiment as positive or negative. The client application 127 performs functions to use the enterprise-specific neural network model 118 to recreate the trained neural network. Client device 109 includes a BNNS Neural Network library as a library 166 that client application 127 uses to recreate the topology from the neural network model 118 and to copy weights into client application 127. As discussed previously, a topology relates input nodes to output nodes based on the approach used to train the neural network. Weights represent knowledge gained through training the neural network. The client application 127 extracts the topology and weights from the neural network model 118. The client application 127 can apply text to the input nodes of the neural network model 118 so that the output nodes correspond to a classification of the text applied to the input nodes.

To perform a text classification in an example, the client application 127 runs a Parsimmon open source library as library 166 to tokenize the email, then applies the weights to the tokenized output. To identify the probability that an email is positive or negative, the client application 127 applies an algorithm, such as a softmax algorithm, to the output nodes after the input is run through the neural network by the client application 127. One purpose of using the softmax algorithm is to validate that an output node will have a value in the range of zero (0) to one (1) and that a higher numeric value indicates a higher probability that a given email has the sentiment corresponding to the output node.

For example, if a word matches one of the positive or negative input nodes, a value of one (1) is specified. If the word corresponding to an input node does not exist in the unread email, a value of zero (0) is specified. If the unread email is of a positive sentiment, a value of one (1) will be specified for the positive sentiment output node. Likewise, if the unread email is of a negative sentiment, a value of one (1) will be put in the negative sentiment output node.

At step 406, the client application 127 displays a user interface showing emails sorted by sentiment. As an example, the client application 127 can be an email application configured to display a sentiment of unread emails. The output value of a node in the neural network represents the probability that an email corresponds to the sentiment of the node. The client application 127 can display a user interface that includes the sentiment. By applying the topology and weights extracted from the neural network model 118 as discussed previously, the client application 127 can perform text classification based on emails. As described shortly, the client application 127 can also use numerous algorithms in combination with a neural network model 118 to sort emails based on sentiment. Thereafter, the process can proceed to completion.

In another example, the neural network approach discussed above could be combined with an algorithm. The client application 127 can leverage an algorithm to determine which words in an email are positive and which words are negative. As an example, the Harvard Inquirer dataset has words that correlate with positive and negative sentiment. The client application 127 can also compute the overall sentiment of an email by summing the count of positive and negative words. A positive word would add one point to the score. Also, a negative word would subtract one point from the score. If the overall score is above zero (0), the sentiment of the email is positive. If the overall score is less than zero (0), the sentiment of the email is negative. To account for differences in what a user of the client application 127 would recognize as a positive or negative email, the client application 127 can display a user interface that allows a user to adjust the minimum threshold score to identify an email as positive or negative. The client application 127 can consider emails under the minimum threshold to be neutral. For example, the following contains neutral sentiment: "I like the way Boxer lets me see email, calendar, and contacts," and "We all detest having to pay extra money, but do love it when it is a good value."

In another example, the neural network approach can be combined with a different algorithm. This example can allow the client application 127 to sort by sentiment and then sender importance, and it is likely to work well for users in customer support and sales related fields. This example includes an algorithm to classify an email based on identifying the importance of the sender of the email. Once the sentiment of an email has been identified, that information can be combined with the email sender's importance to identify the urgency of a response. Combining the sentiment with the importance of the email sender provides a mechanism which identifies the set of emails the user should respond to at the beginning of the workday.

Displaying the sentiment of an email combined with the overall importance of the sender to the receiver can reduce the need for one to scan through emails at the beginning of the workday. Grouping unread emails by sentiment and then sorting by sender importance can identify the emails which warrant priority attention.

As one example of the client application 127 determining importance of an email sender, the client application 127 can access contacts stored as client data 124 or enterprise data 121. The client application 127 allows a user of client device 109 to specify an attribute that represents the importance of an email sender. The importance can be given on a scale of zero (0) to one hundred (100). The attribute can be stored in the client data 124. Also, some email server systems such as Microsoft® Exchange and Microsoft® Office 365 support the ability of having this attribute stored on the server, (or in a cloud, SaaS, or multi-tenant environment), which is accessible to multiple client devices 109.

Different categories of email sender importance can also be associated with a number. A category that is more important than another can have a higher numerical value. Example categories are: Normal, Important, and Very Important. As the number of contacts within the highest ranking category can be relatively small, the client application 127 renders a user interface that allows the user an option to individually rank the contacts. The client application 127 can also pre-populate the initial importance of contacts by counting the number of emails, stored as enterprise data 121 or client data 124, that a user on client device 109 has sent to an individual contact. As users send different amounts of email, one way to normalize the data would be to compute the average of sent emails per contact as well as the standard deviation. Assuming a normal distribution, contacts that are one standard deviation above the average would be classified as "Important" (~16%), and contacts that are two standard deviations above the average would be classified as "Very Important."

In other examples, the present disclosure could be used along with other enterprise data, such as sales data, including total sales, revenue, pipeline amount, forecasted opportunity amount, quote amount, order amount, and the like. Enterprise data can additionally include metrics related to customer support, such as number of associated service requests, service request priority, violated service level agreements, and economic impact of a potential outage. The present disclosure also contemplates using a database that is pre-populated with enterprise data to provide a default sender importance option. In this way, an enterprise-specific neural network model 118 can be generated that is based on any enterprise data or client data.

Functionality attributed to the management application 106 can be implemented in a single process or application or in multiple processes or applications. The separation or segmentation of functionality as discussed herein is presented for illustrative purposes only.

The flowcharts of FIGS. 2-4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The enterprise computing environment 103 and the client devices 109 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the client application 127 and/or other components can be stored in one or more storage devices and be executable by one or more processors. Also, a data store can be stored in the one or more storage devices.

The client application 127, management application 106, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described herein can be implemented as modules or components of a single application. Further, one or more components described herein can be executed in one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A system for providing an enterprise-specific neural network model to a client device, comprising:
at least one computing device; and
program instructions executable in the at least one computing device that, when executed by the at least one computing device, cause the at least one computing device to:
create a training environment for training a neural network using enterprise data authorized by a client device, the training environment being accessible by a locator;

cause the client device to send the enterprise data to the training environment by generating a request for the client device to authorize sending the enterprise data to the training environment, transmitting a request for the client device to authenticate with the training environment, causing a certificate to be created, the certificate being associated the client device, and causing the client device to authenticate with the training environment using the certificate and the locator;

cause the training environment to create a model for performing a text classification based on providing the enterprise data to an input associated with the training environment; and send the model to the client device.

2. The system of claim 1, wherein the program instructions create the training environment by at least:

instructing an infrastructure manager to create a cloned environment based on a template;

causing a hypervisor to start at least one virtual machine associated within the cloned environment, the at least one virtual machine configured to run a training application; and wherein the input associated with the training environment comprises at least one parameter of the training application.

3. The system of claim 2, wherein the training application comprises program instructions executable to cause a processor associated with the virtual machine to:

preprocess the enterprise data to create tokenized data;

execute a TensorFlow framework to create the model based on applying a Bag of Words approach to the tokenized data; and store the model.

4. The system of claim 1, wherein sending the model to the client device comprises:

causing a push notification to be sent to the client device.

5. The system of claim 1, wherein the enterprise data is client data stored in a data store associated with the client device.

6. The system of claim 1, further comprising:

wherein the model contains a topology and weights extractable using a basic neural network subroutines (BNNS) library, the topology relating at least one input node to at least one output node, the weights representing knowledge gained through training the neural network;

wherein the text classification comprises applying one or more emails to the at least one input node, the text classification outputting to the at least one output node; and wherein the at least one output node represents a sentiment of the email.

7. A computer-implemented method for providing an enterprise-specific neural network model to a client device, comprising:

creating, by a computing device, a training environment for training a neural network using enterprise data authorized by a client device, the training environment being accessible by a locator;

causing, by the computing device, the client device to send the enterprise data to the training environment by generating a request for the client device to authorize sending the enterprise data to the training environment, transmitting a request for the client device to authenticate with the training environment, causing a certificate to be created, the certificate being associated the client device, and causing the client device to authenticate with the training environment using the certificate and the locator;

causing, by the computing device, the training environment to create a model for performing a text classification based at least in part on providing the enterprise data to an input associated with the training environment; and sending, by the computing device, the model to the client device by causing the client device to authenticate with the training environment to receive the model.

8. The method of claim 7, the creating a training environment further comprising:

instructing an infrastructure manager to create a cloned environment based on a template;

causing a hypervisor to start at least one virtual machine associated within the cloned environment, the at least one virtual machine configured to run a training application; and wherein the input associated with the training environment comprises at least one parameter of the training application.

9. The method of claim 8, the training application further comprising:

preprocessing the enterprise data to create tokenized data;

executing a TensorFlow framework to create the model based on applying a Bag of Words approach to the tokenized data; and storing the model.

10. The method of claim 7, wherein sending the model to the client device comprises:

causing a push notification to be sent to the client device.

11. The method of claim 7, wherein the enterprise data is client data stored in a data store associated with the client device.

12. The method of claim 7, further comprising:

wherein the model contains a topology and weights extractable using a BNNS library, the topology relating at least one input node to at least one output node, the weights representing knowledge gained through training the neural network;

wherein the text classification comprises applying one or more emails to the at least one input node, the text classification outputting to the at least one output node; and wherein the at least one output node represents a sentiment of the email.

13. A non-transitory computer-readable medium for providing an enterprise-specific neural network model to a client device embodying program instructions executable in a computing device that, when executed, causes the computing device to:

create a training environment for training a neural network using enterprise data authorized by a client device, the training environment being accessible by a locator;

cause the client device to send the enterprise data to the training environment by generating a request for the client device to authorize sending the enterprise data to the training environment, transmitting a request for the client device to authenticate with the training environment, causing a certificate to be created, the certificate being associated the client device, and causing the client device to authenticate with the training environment using the certificate and the locator;

cause the training environment to create a model for performing a text classification based at least in part on providing the enterprise data to an input associated with the training environment; and send the model to the client device by causing the client device to authenticate with the training environment to receive the model.

14. The non-transitory computer-readable medium of claim 13, wherein executing the program instructions further causes the training environment to be created by:

instructing an infrastructure manager to create a cloned environment based on a template;

causing a hypervisor to start at least one virtual machine associated within the cloned environment, the at least one virtual machine configured to run a training application; and wherein the input associated with the training environment comprises at least one parameter of the training application.

15. The non-transitory computer-readable medium of claim 14, wherein the training application comprises program instructions executable to cause a processor associated with the virtual machine to:

preprocess the enterprise data to create tokenized data;

execute a TensorFlow framework to create the model based on applying a Bag of Words approach to the tokenized data; and store the model.

16. The non-transitory computer-readable medium of claim 13, wherein the enterprise data is client data stored in a data store associated with the client device.

17. The non-transitory computer-readable medium of claim 13 further comprising:

wherein the model contains a topology and weights extractable using a basic neural network subroutines (BNNS) library, the topology relating at least one input node to at least one output node, the weights representing knowledge gained through training the neural network;

wherein the text classification comprises applying one or more emails to the at least one input node, the text classification outputting to the at least one output node; and wherein the at least one output node represents a sentiment of the email.

* * * * *